United States Patent
Ruden et al.

(10) Patent No.: US 9,082,459 B2
(45) Date of Patent: Jul. 14, 2015

(54) MEDIA CADDY HANDLING

(75) Inventors: Shawn Allen Ruden, Longmont, CO (US); Sabrina Lynne Murray, Ardmore, OK (US)

(73) Assignee: Seagate Technology LLC, Cupertino, CA (US)

( * ) Notice: Subject to any disclaimer, the term of this patent is extended or adjusted under 35 U.S.C. 154(b) by 787 days.

(21) Appl. No.: 11/865,358

(22) Filed: Oct. 1, 2007

(65) Prior Publication Data

US 2009/0084696 A1    Apr. 2, 2009

(51) Int. Cl.
*B65D 85/00* (2006.01)
*G11B 33/04* (2006.01)

(52) U.S. Cl.
CPC .................. *G11B 33/0472* (2013.01)

(58) Field of Classification Search
CPC ................. G11B 33/0472; G11B 33/0405
USPC .................. 206/723, 832, 710, 711
See application file for complete search history.

(56) References Cited

U.S. PATENT DOCUMENTS

| | | | |
|---|---|---|---|
| 4,721,207 A * | 1/1988 | Kikuchi | 206/307 |
| 4,805,769 A * | 2/1989 | Soltis et al. | 206/308.2 |
| 4,894,031 A * | 1/1990 | Damon et al. | 439/885 |
| 5,253,755 A * | 10/1993 | Maenke | 206/308.3 |
| 5,575,394 A * | 11/1996 | Nyseth | 206/710 |
| 5,704,494 A | 1/1998 | Nishikiori et al. | |
| 6,070,730 A | 6/2000 | Narisawa et al. | |
| 6,902,059 B2 | 6/2005 | Whalen et al. | |
| 2004/0080852 A1 | 4/2004 | Jenkins et al. | |
| 2006/0021896 A1 | 2/2006 | Cleathero et al. | |
| 2006/0108242 A1* | 5/2006 | Christensen et al. | 206/308.1 |

* cited by examiner

*Primary Examiner* — Anthony Stashick
*Assistant Examiner* — Blaine Neway
(74) *Attorney, Agent, or Firm* — Hall Estill Attorneys at Law

(57) ABSTRACT

A disc caddy and associated method for handling is characterized by a disc cassette having opposing longitudinal side walls joined to opposing lateral end walls forming a substantially rectangular structure defining open first and second ends. A first removable cover is provided for closing the first end, and a second removable cover is provided for closing the second end. The second removable cover defines barb members that latchingly engage respective strikes defined by the first removable cover that extend substantially parallel to the end walls. The disc cassette has protuberant features defining reference hold-down surfaces, and the first removable cover defines clearance apertures through which the hold-down surfaces extend.

6 Claims, 6 Drawing Sheets

MEDIA CADDY HANDLING

BACKGROUND

Manufacturing operations have significantly evolved in complexity through the integration of sophisticated automation devices and associated methods. Gains have been realized both in productivity and reliability as past reliance on human judgment and manipulation has been replaced by processor-based systems.

An example of this is manifested in the production equipment used in processing thin disc substrates that are made into storage media for data storage devices like disc drives. During storage and transit these discs are preferably stored for safekeeping in plastic caddies that individually support and spatially separate a plurality of the discs. The caddy also preferably longitudinally aligns the discs along their centroid axes to facilitate the use of automated end effectors to pick and place the discs from and to the caddy during processing steps.

The caddy preferably has a top cover that engages a cassette body to form a sealed enclosure that protects the discs inside from contamination during storage and transit. What is lacking is a top cover that is conceived to be optimal for using automated processing equipment to remove and replace it. It is to that needed improvement in the art that the claimed embodiments are directed.

SUMMARY

Claimed embodiments are generally directed to an apparatus and associated method for handling a disc caddy.

In some embodiments the disc caddy is characterized by a disc cassette having opposing longitudinal side walls joined to opposing lateral end walls forming a substantially rectangular structure defining open first and second ends. A first removable cover is provided for closing the first end, and a second removable cover is provided for closing the second end. The second removable cover defines barb members that latchingly engage respective strikes defined by the first removable cover that extend substantially parallel to the end walls. The disc cassette also has protuberant features defining reference hold-down surfaces, and the first removable cover defines clearance apertures through which the hold-down surfaces extend.

These and various other features and advantages which characterize the claimed embodiments will become apparent upon reading the following detailed description and upon reviewing the associated drawings.

DETAILED DESCRIPTION

Figure 1:
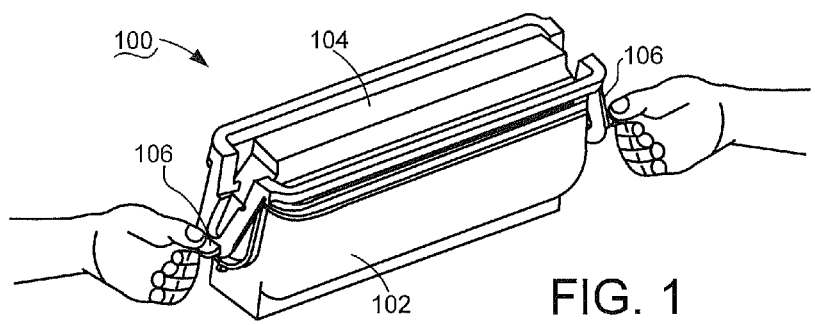
FIG. 1 is an isometric depiction of a disc caddy that is constructed in accordance with related art solutions.

Turning to the FIGS. generally, and for now particularly to FIG. 1 which depicts a caddy 100 that is constructed in accordance with attempted solutions in the related art. The caddy 100 has a disc cassette 102 into which the discs are longitudinally stacked, and a top cover 104 that seals a top opening in the disc cassette 102 for protecting the discs from contamination and/or debris during storage and transit.

Although not shown, typically the caddy 100 also includes a bottom cover to seal a bottom opening in the disc cassette 102. The bottom opening is sometimes used to access the discs inside the disc cassette 102 during picking and placing them, and sometimes used as a drain when the discs are subjected to a chemical bath. However, even when a bottom opening is not needed, the bottom opening with bottom cover combination is preferable to a solid bottom because removing the bottom cover facilitates cleaning the disc cassette 102 during normal use.

FIG. 1 shows that to remove the top cover 104 the opposing flaps 106 are pulled away from the disc cassette 102 so that they are outwardly-angled with respect to the medial portion of the top cover 104. Likewise, when attaching the top cover 104 the medial portion must be matingly engaged with the top opening while holding the tabs 106 outwardly angled from the ends of the disc cassette 102. While this construction might be adequate for manually removing and replacing the top cover 104, as depicted, it is not suited for use with automated processing equipment. That is, grasping the outwardly-angled flaps 106 does not reliably position the medial portion of the top cover 104 for placement. Even if that shortcoming were resolved, the motions necessary to remove and attach the top cover 104 are generally not optimal for automating the process.

Figure 2:
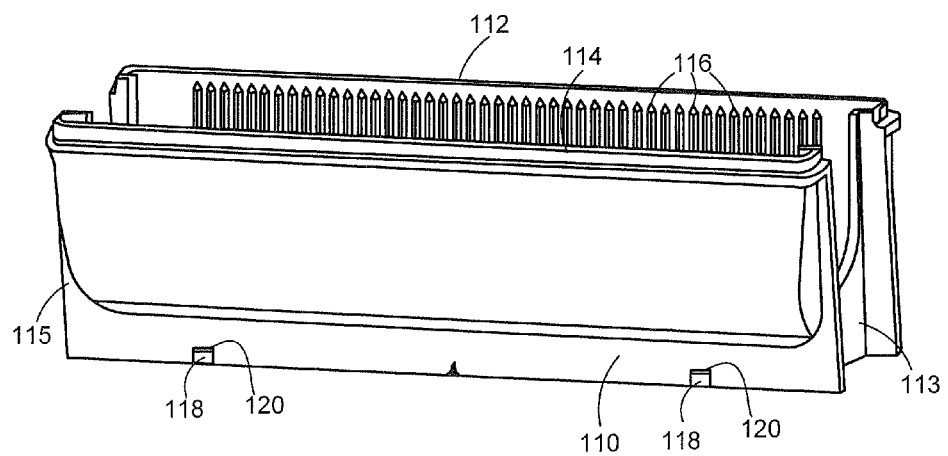
FIG. 2 is an isometric depiction of a disc cassette constructed in accordance with the claimed embodiments.

FIG. 2 depicts a disc cassette 110 that is constructed in accordance with the claimed embodiments. The disc cassette 110 has opposing longitudinal walls 112, 114 defining slots 116 for receiving a plurality of discs (not depicted) in a spaced apart configuration. Opposing end walls 113, 115 are connected to the longitudinal walls 112, 114 to define a substantially rectangular structure with an open top and an open bottom.

In this illustrative embodiment the disc cassette 110 also has two protuberant features 118 extending from a lower end of the longitudinal walls 112, 114. The protuberant features 118 define substantially laterally directed reference hold-down surfaces 120.

Figure 3:
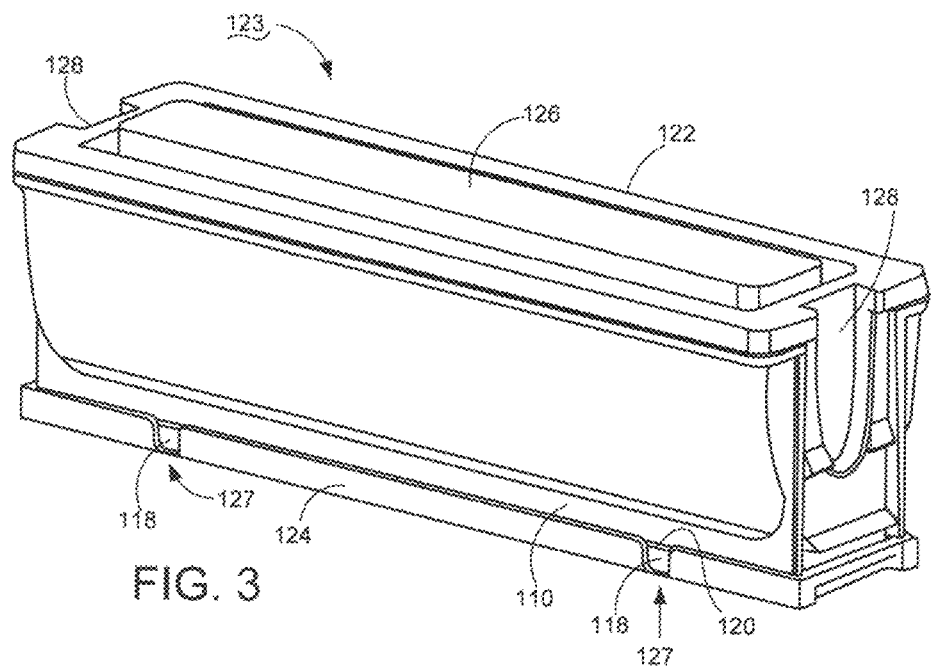
FIG. 3 is an isometric depiction of a caddy constructed in accordance with the claimed embodiments.

FIG. 3 depicts a caddy 123 of the claimed embodiments, which includes the disc cassette 110, a top cover 122, and a bottom cover 124 to cover the top and bottom openings thereof, respectively. The top cover 122 has a medial 126 portion sized in relation to the top opening in the disc cassette 110. Flaps 128 depend from each of proximal and distal ends of the medial portion 126 to cover openings in the end walls 113, 115 that are contiguous to the top opening of the disc cassette 110.

Figure 4:
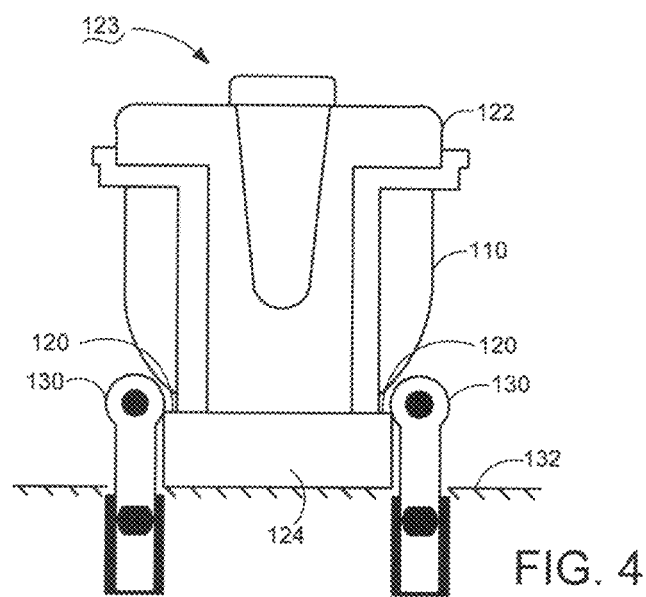
FIG. 4 is an end elevational depiction of the caddy of FIG. 3 showing retractable end effectors engaging the protuberant hold-down surfaces that are defined by the disc cassette.

The bottom cover 124 defines apertures 127 through which the protuberant features 118 extend. FIG. 4 is an end view of the caddy 123 depicting how automated retractable fingers 130 contactingly engage the reference hold-down surfaces 120 to assert a hold-down force on the disc cassette 110 against a reference surface 132, such as at a disc load/unload station.

Figure 5:
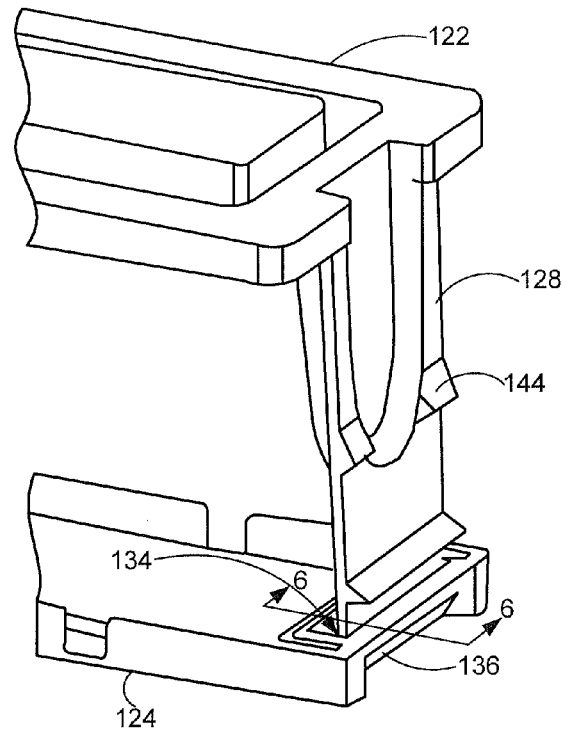
FIG. 5 depicts one end of the top cover and the bottom cover in the manner that they are operably latched together as in FIG. 3, but with the disc cassette not shown for clarity sake.
Figure 6:
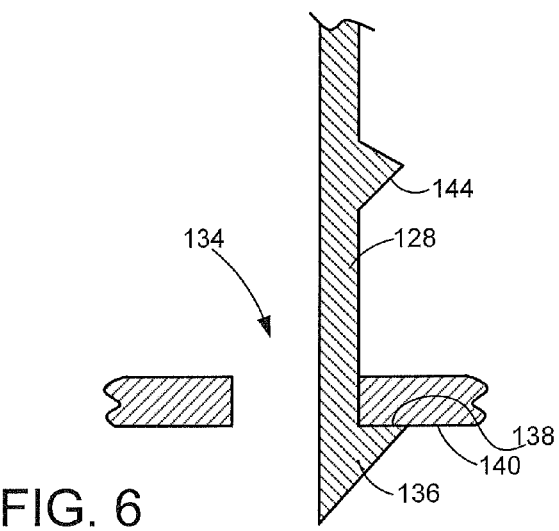
FIG. 6 is a cross sectional view taken along the line 6-6 in FIG. 5 depicting the top cover and bottom cover latched together.

It will be noted that the retention of the covers 122, 124 is enhanced by making them latchingly engage each other, sandwiching the disc cassette 110 therebetween. FIG. 5 depicts the top cover 122 and the bottom cover 124 latched together as they are in FIG. 3, but with the disc cassette 110 not shown to more clearly depict the bottom cover 124 defining an aperture 134 that is sized to receivingly engage a distal end of the flap 128. FIG. 6 is a cross sectional view along the line 6-6 in FIG. 5, showing the flap 128 defines a barb 136 at a distal end thereof. The distal end is guided into the aperture 134 by a sharp point and tapered edge of the barb surface 138 that is directed toward the distal end. The tapered edge terminates at an abrupt shoulder that latchingly engages against a strike surface 140 adjoining the edge of the aperture 134. The flap 128 is aligned with the aperture 134 such that it is biased to the latching engagement position of FIG. 6 once the barb 136 passes beyond the strike surface 140.

Figure 7:
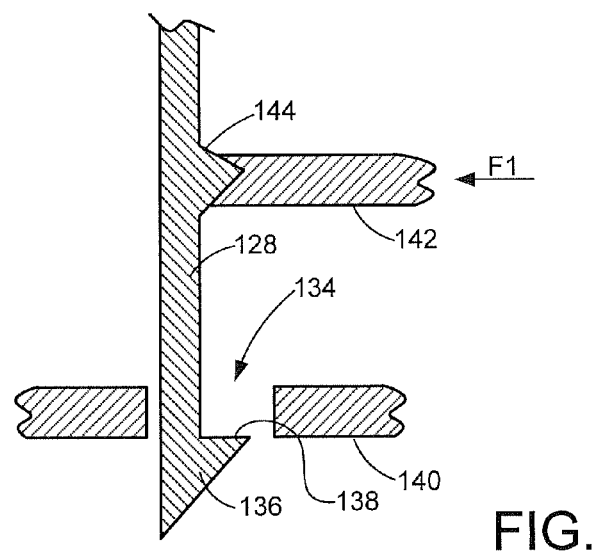
FIG. 7 is a view similar to FIG. 6 but depicting an end effector having displaced the top cover flaps relative to the bottom cover to unlatch the covers.
Figure 8:
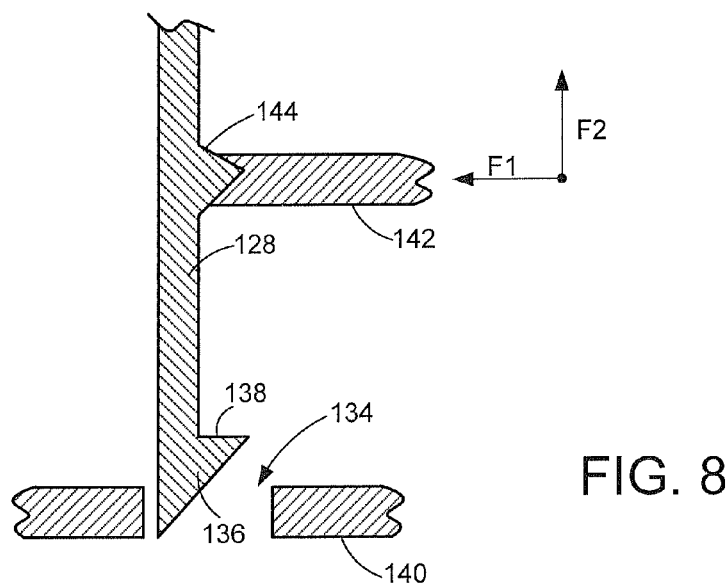
FIG. 8 is a view similar to FIG. 7 but depicting the end effector having lifted the top cover away from the disc cassette.

Preferably, the barb surface 138 is directed away from the disc cassette 110 as illustrated, so that as FIG. 7 shows an end effector 142 affecting an unlatching force F1 directed toward the disc cassette 110 displaces the lower portion of the flap 128 to clearingly disengage the barb 136 from the strike surface 140. The flap 128 is provided with a protuberant surface 144, and the end effector 142 is made to matingly engage the protuberant surface 144. FIG. 8 shows that this permits asserting F1 while also asserting a lifting force F2 with the end effector 142 to lift the top cover 122 away from the disc cassette 110. Although in these embodiments the end effector 142 is described as asserting the forces F1, F2 to unlatch and remove the top cover 122, in equivalent alternative embodiments the disc cassette 110 could be moved relative to a fixed end effector 142 to accomplish removal of the top cover 122.

Figure 9:
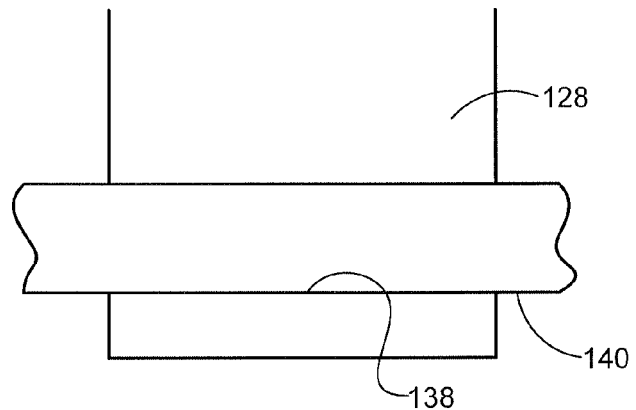
FIG. 9 is an end elevational depiction of the lower end of the flap in FIG. 6.
Figure 10:
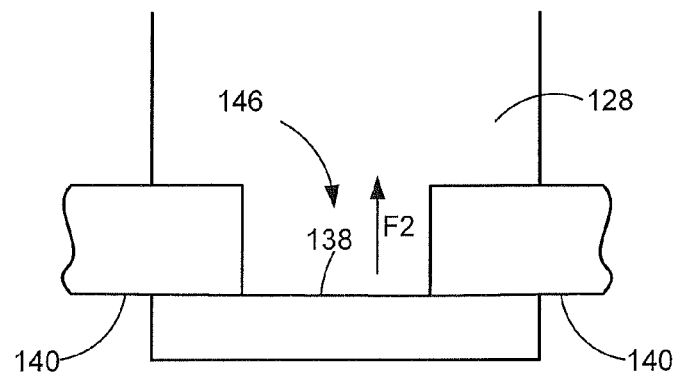
FIG. 10 is a view similar to FIG. 9 but depicting an alternative equivalent construction of the claimed embodiments.

FIG. 9 is an end elevational depiction of the lower portion of FIG. 6, showing that in the illustrative embodiments the strike surface 140 continuously engages the barb surface 138 in the latching engagement of the top and bottom covers 122, 124. FIG. 10 depicts alternative embodiments wherein the strike surface 140 is segmented, such that it discontinuously engages the barb surface 138 in the same latching engagement. FIG. 10 permits using an end effector that is configured to matingly engage the barb surface 138 itself in the gap 146 to unlatch and remove the tope cover 122 in the manner described above, but where the end effector engaged the protuberant feature 144. Engaging the barb surface 138 itself means that the protuberant feature 144 can be eliminated, simplifying construction of the top cover 124.

Figure 11:
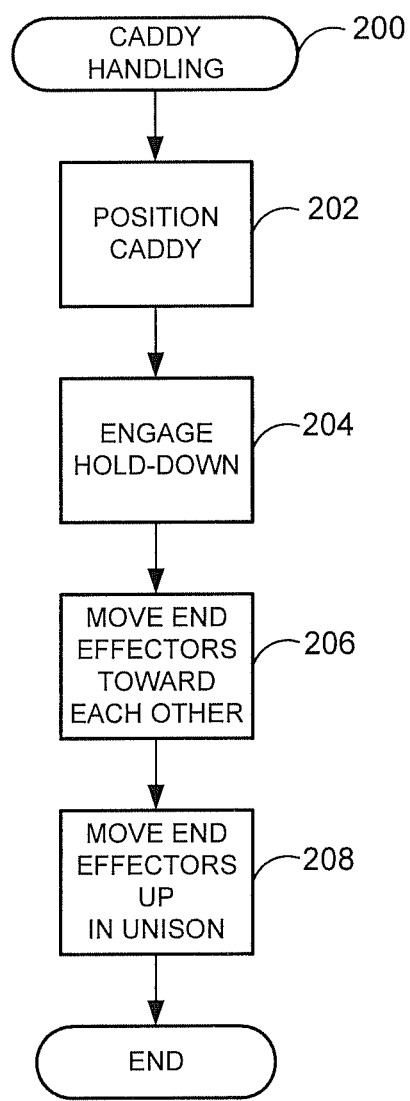
FIG. 11 is a flowchart depicting steps in practicing a method for CADDY HANDLING in accordance with embodiments of the present invention.

Given the aforedescribed structure, FIG. 11 is a flowchart depicting programming steps in an automated method 200 for CADDY HANDLING in accordance with embodiments of the present invention. The method 200 begins in block 202 with positioning the caddy in a desired load/unload position. In block 204 retractable end effectors engage the protuberant features at the lower end of the disc cassette to affix the caddy at the load/unload position. In block 206 another set of end effectors move toward each other and pressingly engage against the downwardly extending flaps of the top cover to unlatch the top cover from the bottom cover. Finally, while maintaining the opposing bias on the flaps from the operation of step 206, the end effectors are also lifted in unison to carry the top cover away from the disc cassette.

It is to be understood that even though numerous characteristics and advantages of various embodiments have been set forth in the foregoing description, together with details of the structure and function of various embodiments, this description is illustrative only, and changes may be made in detail, especially in matters of structure and arrangements of parts within the principles of the present embodiments to the full extent indicated by the broad general meaning of the terms in which the appended claims are expressed. For example, the particular elements may vary in type or arrangement without departing from the spirit and scope of the present embodiments.

In addition, although the embodiments described herein are described in relation to handling data storage discs, it will be appreciated by those skilled in the art that the claimed subject matter is not so limited and various other component handling systems employing a portable component caddy can utilize the present embodiments without departing from the spirit and scope of the claimed embodiments.

What is claimed is:

1. An apparatus for storing a disc, comprising:
   a disc cassette having opposing longitudinal side walls joined to opposing lateral end walls forming a substantially rectangular structure having open first and second ends;
   a first removable cover for operably closing the first open end, the first removable cover having a strike surface extending substantially orthogonal to the end walls and defining an aperture; and
   a second removable cover for operably closing the second open end, the second removable cover defining a barb member having a leading end and a backward projecting barb surface that operably passes through the aperture and is there biased away from the disc cassette so that the barb surface abuttingly engages the strike surface to latchingly engage the covers together and thereby prevent separation thereof without first moving the barb surface toward the disc cassette to clearingly disengage from the strike surface before withdrawing the barb surface through the aperture.

2. The apparatus of claim 1 wherein the second removable cover comprises a medial portion sized in relation to the second open end, and a substantially orthogonally directed flap extending from the medial portion, the flap defining the barb member.

3. The apparatus of claim 1 wherein the strike surface continuously engages the barb member when the covers are latchingly engaged together.

4. The apparatus of claim 1 wherein the strike surface discontinuously engages the barb member when the covers are latchingly engaged together.

5. The apparatus of claim 1 wherein the disc cassette defines at least one protuberant feature extending from the first end of at least one longitudinal wall defining a substantially laterally directed reference hold-down surface.

6. The apparatus of claim 5 wherein the first removable cover defines an aperture through which the protuberant feature extends.

* * * * *